(No Model.)
N. JOHNSON.
SAW SWAGE.
No. 327,271. Patented Sept. 29, 1885.
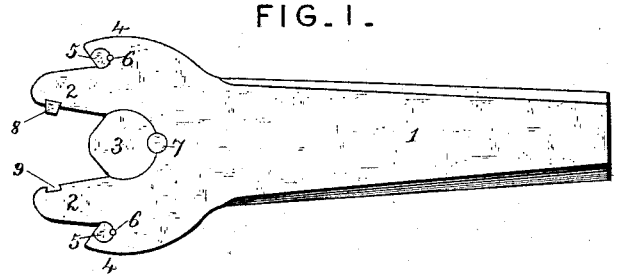
FIG. I.
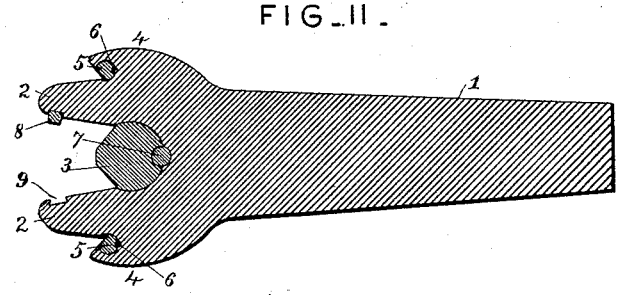
FIG. II.
ATTEST-
Geo. T. Smallwood
Edward Stew.
INVENTOR-
Nelson Johnson.
By Knight Bros.
attys.

UNITED STATES PATENT OFFICE.

NELSON JOHNSON, OF JASPER, NEW YORK.

SAW-SWAGE.

SPECIFICATION forming part of Letters Patent No. 327,271, dated September 29, 1885.

Application filed August 4, 1884. (No model.)

*To all whom it may concern:*

Be it known that I, NELSON JOHNSON, a citizen of the United States, residing at Jasper, in the county of Steuben and State of New York, have invented certain new and useful Improvements in Saw-Swages, of which the following is a specification.

My invention consists, first, in providing on one or both sides of the main jaws of a saw upset or swage a supplemental jaw having a swage-pin for upsetting the teeth of small bench-saws or for bringing the teeth of larger saws to a fine edge after they have been spread or upset by the main swage.

My invention consists, further, in providing the face of one or more of the jaws of a saw-swage with an adjustable rest or bearing for the top of the tooth, whereby it may be held at an angle to the swaging-face of the jaw and the tooth thereby formed with a greater or less chisel-edge, as may be desired.

In order that my invention may be fully understood, I will proceed to describe it with reference to the accompanying drawings, in which—

Figure I is a side elevation, and Fig. II is a longitudinal section of my improved swage.

The stock of the implement is represented at 1, the main swaging-jaws at 2, and the main swage-pin at 3. The exterior portions of the jaws 2 are shouldered at 4, and said shoulders recessed to receive additional small swage-pins, 5, which may be held from rotation in their seats by keys 6, or in any other well known or desirable manner. In using these supplemental swages the tooth to be swaged is placed between the swage-pin 5 and the rear face of the jaw 2, which is dressed off for the purpose.

It will be apparent that an equivalent arrangement of swaging-jaws to that which I have shown and described would be one in which but one of the small swage-pins is employed, thus forming a simpler implement.

The main swage-pin 3 is held from rotation in the usual manner by a key, 7, and its swaging-faces may be given any desired angle or bevel that may be desired.

8 represents one of the adjustable rests or bearings for the top of the saw-tooth, which is preferably held in place by a dovetail groove, 9, so as to be readily removable. It will be seen that by the use of such a bearing for the tooth the top thereof will be formed with a greater or less chisel-edge, according to the height of the rest. When the tooth is long and slender, it is desirable to form it with more of a chisel-edge than when it is short and stout, as it is thereby rendered better able to resist knots, &c.; hence it will be seen that rests of different heights will be required, according to the condition of the teeth.

I do not limit myself to any particular form or location of the rests, as it is obvious that anything placed between the face of the jaw and the top of the tooth will hold said top at an angle with the swaging-face of the jaw and thereby accomplish the desired result.

I am aware that saw-swages have been before provided with a supplemental swage-pin mounted in the stock in a position or plane relatively to its own rigid jaw, transverse to that which the main pin occupies relatively to its rigid jaw. In other words, the main pin is so placed with reference to its rigid jaw as to form a transverse concavity at the end of the tooth, while the supplemental pin is so placed with reference to its rigid jaw as to form a longitudinal concavity at the end of the tooth. The object of my invention is to provide a swage that will supplement the work already begun by the main swage, which object is accomplished as hereinbefore set forth.

Having thus described my invention, the following is what I claim as new therein and desire to secure by Letters Patent—

1. The combination, with the main swaging jaw and pin, of a supplemental swaging-jaw and a pin of much smaller diameter than the main pin, said supplemental jaw and pin occupying the same positions relatively to each other as do the main jaw and pin, whereby the action of the main jaw and pin are supplemented, substantially as described.

2. In a saw-swage, the combination, with the jaw thereof, of a rest or support secured to the face thereof by a dovetail joint, as set forth.

NELSON JOHNSON.

Witnesses:
D. L. FREEBORN,
D. S. MCEWEN.